(12) United States Patent
Herfurth et al.

(10) Patent No.: US 11,104,614 B2
(45) Date of Patent: Aug. 31, 2021

(54) GYPSUM PLASTERBOARD

(71) Applicant: Knauf Gips KG, Iphofen (DE)

(72) Inventors: Dominik Herfurth, Iphofen (DE); Felix Friedel, Adelsdorf (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 16/471,444

(22) PCT Filed: Dec. 20, 2016

(86) PCT No.: PCT/EP2016/002139
§ 371 (c)(1),
(2) Date: Jun. 19, 2019

(87) PCT Pub. No.: WO2018/113895
PCT Pub. Date: Jun. 28, 2018

(65) Prior Publication Data
US 2020/0255335 A1    Aug. 13, 2020

(51) Int. Cl.
*B32B 7/022* (2019.01)
*B32B 7/08* (2019.01)
(Continued)

(52) U.S. Cl.
CPC .............. *C04B 28/14* (2013.01); *B32B 7/022* (2019.01); *B32B 7/08* (2013.01); *B32B 7/12* (2013.01);
(Continued)

(58) Field of Classification Search
CPC ....... Y10T 428/24942; Y10T 428/2495; Y10T 428/24967; Y10T 428/24983;
(Continued)

(56) References Cited

U.S. PATENT DOCUMENTS 3,562,097 A    2/1971 von Hazmburg
4,195,110 A    3/1980 Dierks et al.
(Continued)

FOREIGN PATENT DOCUMENTS

CA    2075401 A1    2/1993
DE    1696269 A1    11/1971
(Continued)

OTHER PUBLICATIONS

International Search Report for PCT/EP2016/002139 (4 pages). (Year: 2017).*
(Continued)

*Primary Examiner* — Maria V Ewald
*Assistant Examiner* — Ethan A. Utt
(74) *Attorney, Agent, or Firm* — The Webb Law Firm

(57) ABSTRACT

The invention concerns a gypsum plasterboard (10) comprising at least an upper gypsum layer (16) having a first density, first hardness and first thickness and a lower gypsum layer (17) having a second density, a second hardness and a second thickness. The first density is lower than the second density and/or the first hardness is lower than the second hardness, and the first thickness is lower than the second thickness. The plasterboard according to the invention are heavy or dense plasterboards with an enhanced fixing ability.

20 Claims, 2 Drawing Sheets

(51) Int. Cl.
*B32B 13/08* (2006.01)
*E04C 2/04* (2006.01)
*C04B 28/14* (2006.01)
*B32B 7/12* (2006.01)
*C04B 111/00* (2006.01)

(52) U.S. Cl.
CPC .............. *B32B 13/08* (2013.01); *E04C 2/043* (2013.01); *B32B 2307/536* (2013.01); *B32B 2307/72* (2013.01); *B32B 2419/04* (2013.01); *C04B 2111/0062* (2013.01); *C04B 2111/00405* (2013.01)

(58) Field of Classification Search
CPC ........... Y10T 428/24992; Y10T 428/26; Y10T 428/266; Y10T 428/269; Y10T 428/27; Y10T 428/249953; Y10T 428/249967; Y10T 428/249968; Y10T 428/249924; Y10T 428/249926; Y10T 428/249932; Y10T 428/31971; Y10T 428/31993; Y10T 428/31996; B32B 7/00; B32B 7/02; B32B 7/022; B32B 13/00; B32B 13/02; B32B 13/04; B32B 13/08; B32B 13/14; E04B 2/00; E04B 2/72; E04B 2/723; E04B 2103/02; E04B 2103/04; E04C 2/00; E04C 2/02; E04C 2/04; E04C 2/043; E04C 2/06; E04C 2/10; E04C 2/16; E04C 2/26; E04C 2/284; E04C 2/288; E04C 2/30; E04C 2/44; E04C 2/46; C04B 2111/00; C04B 2111/00034; C04B 2111/00241; C04B 2111/00413; C04B 2111/00474; C04B 2111/00482; C04B 2111/00508; C04B 2111/00517; C04B 2111/00568; C04B 2111/00612; C04B 2111/0062; C04B 2111/30; C04B 2111/40; C04B 2201/00; C04B 2201/20; C04B 2201/50; C04B 7/00; C04B 7/02; C04B 7/04; C04B 11/00; C04B 28/00; C04B 28/14; C04B 28/141; C04B 28/142; C04B 28/143; C04B 28/144; C04B 28/145; C04B 28/146; C04B 28/147; C04B 28/148

USPC ....... 428/212, 213, 215, 217–220, 332, 337, 428/339, 340, 304.4, 312.2, 312.4, 292.1, 428/292.7, 294.7, 532, 537.5, 537.7, 688, 428/689, 699, 701, 702, 703; 52/506.01; 106/638, 672, 680, 713, 735, 772, 783
See application file for complete search history.

(56) References Cited

U.S. PATENT DOCUMENTS

| | | |
|---|---|---|
| 5,714,032 A | 2/1998 | Ainsley et al. |
| 6,508,895 B2 | 1/2003 | Lynn et al. |
| 2002/0069950 A1 | 6/2002 | Lynn et al. |
| 2004/0103610 A1 | 6/2004 | Axsom |
| 2007/0082170 A1 | 4/2007 | Colbert et al. |
| 2008/0223258 A1* | 9/2008 | Bruce ................ B28B 19/0092 106/678 |
| 2009/0087616 A1* | 4/2009 | Hennis ............... B28B 19/0092 428/141 |
| 2009/0169878 A1 | 7/2009 | Rigaudon et al. |
| 2012/0207989 A1* | 8/2012 | Xu ......................... B32B 13/08 428/213 |
| 2014/0124291 A1 | 5/2014 | Dugan et al. |
| 2015/0064488 A1* | 3/2015 | Foster .................... B32B 37/12 428/514 |

FOREIGN PATENT DOCUMENTS

| | | |
|---|---|---|
| DE | 4222872 A1 | 2/1993 |
| EP | 0634255 A1 | 1/1995 |
| EP | 0985504 A1 | 3/2000 |
| JP | S53120802 U | 3/1976 |
| JP | 2000102914 A | 4/2000 |
| JP | 2007247393 A | 9/2007 |
| RU | 2427550 C2 | 5/2010 |
| WO | 2015185143 A1 | 12/2015 |

OTHER PUBLICATIONS

Plotnikov. "Drywall: Step by Step", Centerpolygraph, Moscow, 2014, 128 p, p. 4, paragraph 5-13, p. 7, paragraph 8-10.

* cited by examiner

GYPSUM PLASTERBOARD

CROSS-REFERENCE TO RELATED APPLICATION

This application is the United States national phase of International Application No. PCT/EP2016/002139 filed Dec. 20, 2016, the disclosure of which is hereby incorporated by reference in its entirety.

BACKGROUND OF THE INVENTION

Field of the Invention

The present invention relates to a gypsum plasterboard, a use of a gypsum plasterboard, a drywall construction and a method for fastening a gypsum plasterboard. Especially, the invention concerns heavy or dense plasterboards with enhanced fixing ability.

Description of Related Art

Dense and/or hard plasterboards in drywall construction are usually used if the construction has to be either very strong or provide good sound properties. As the sound dampening capacity of a wall structure increases with increasing mass of the structure, highly-dense plasterboards are preferred for these applications. However, very dense plasterboards have the drawback that they exhibit poor workability especially with respect to their ability to being fixed by screws. The holes for the fixing means in the plasterboard have to be predrilled, and the plasterboard material is prone to chipping at the drill edges. Screw heads do not enter the material of the upper surface easily and if they enter they cause the board material to bulge and form a protruding ring wall around the screw head. This ring wall has to be abraded manually or extra depressions which allow for the incorporation of the screw heads have to be provided in order to achieve a high quality surface of the wall. Taking into account that several tens of screws have to be used for fastening a single wall, this represents an unbearable effort.

Furthermore, special care has to be administered when screwing the plasterboards to the studs because screwing of dense plasterboards needs a lot of force so that screws are easily overwound.

It is an object of the present invention to propose a gypsum plasterboard, which shall allow a reliable fastening to a support structure. Moreover, a corresponding use of a gypsum plasterboard, a corresponding gypsum plasterboard system and a corresponding method of fastening a gypsum plasterboard shall be proposed. This object is achieved by the subject matter of the enclosed claims.

SUMMARY OF THE INVENTION

According to the invention, a gypsum plasterboard comprises in particular at least one upper gypsum layer having a first density, first hardness and first thickness and a lower gypsum layer having a second density, second hardness and a second thickness, wherein the first density is lower than the second density and/or wherein the first hardness is lower than the second hardness and wherein the first thickness is preferably lower than the second thickness.

A core aspect of the invention is that an upper gypsum layer with comparatively low density and/or hardness is provided so that a reliable fastening of the gypsum plasterboard can be achieved. In particular, the inventors have found that, when a head of a fastening means (such as a screw or a nail) is forced against a surface of a comparatively hard gypsum plasterboard and/or gypsum board with a high density, there are possible drawbacks. In particular, it is possible that the head of a fastening means (in particular of a screw) does not enter the gypsum plasterboard so that the fastening means (in particular screw) moves (rotates) without grip. This can be in particular provoked by a back buckling effect of a (metal) profile (profile metal sheet) in the moment of contact between the head of the fastening means (screw) and the board surface because of a comparatively high (surface) hardness. On the other hand, it is also possible that a head of a fastening means (in particular screw or nail) enters the gypsum plasterboard. However, due to the comparatively high (raw) density, gypsum material bulges around the head. Such bulges, however, deteriorate the smoothness of the gypsum plasterboard surface and are, hence, disadvantages for aesthetic and also technical reasons (if, for example, an application of the plasterboard is desired where a smooth surface is important). In order to avoid such problems, it could be considered to use a gypsum board with comparatively low density and/or hardness. Then, however, either (for a certain application) the gypsum plasterboard must be comparatively thick or there are severe drawbacks regarding the load-bearing capacity (e.g. for pull-out) of the gypsum plasterboard. If, on the other hand, a gypsum plasterboard is provided in accordance with the present invention, an upper gypsum layer with a comparatively low density and/or hardness is provided, a head of a fastening means (such as a screw or nail) can smoothly enter the gypsum plasterboard. Moreover, since the second lower gypsum layer is provided, in addition, a comparatively high load-bearing capacity (for pull-out) can be achieved. In essence, it is possible to provide a reliable, thin plasterboard with good load-bearing performance.

The term "hardness" means, in particular, the impact resistance (or surface hardness or German: Oberflächenhärte) according to 5.12 of DIN EN 520:2009-12 (Conditioning: 40° C.).

The upper gypsum layer is in particular a layer arranged on a visible side of the plasterboard. Accordingly, the lower gypsum layer is particularly arranged on a back side of the plasterboard (with respect to the upper gypsum layer). The visible side may comprise a facer (paper) layer having a higher grammage (area density) than a facer (paper) layer of the backside (preferably at least 1.05 times, further preferably at least 1.2 times as high).

Upper and/or lower gypsum layers are preferably formed from a homogenous material (i.e.

as one homogenous layer of gypsum material). However, it is also possible that upper and/or lower gypsum layers contain two or more gypsum layers. In such a case, the parameters density and hardness should be understood as average density and average hardness. The average should be calculated as weighted arithmetic average (mean) where the weight factors are defined by a ratio of the thickness of the single layer to the overall thickness of the respective upper and/or lower layer. For example, if the lower layer consists of two single layers, having thicknesses of 1 mm or 2 mm, respectively, the weighted arithmetic average is: (⅓*density of the one single layer)+(⅔*density of the other single layer). In any event, it is possible that the gypsum plasterboard comprises a third gypsum layer, in addition to the upper and lower gypsum layers. However, it is preferred that the gypsum plasterboard comprises only the upper and lower gypsum layer (which may in such a case be formed of a homogenous material layer).

Preferably, a ratio of the first thickness to the second thickness is lower than 1:1.05, further preferably lower than 1:2, further preferably lower than 1:4. Furthermore, a ratio of the first thickness to the second thickness may be higher than 1:50, preferably higher than 1:20, further preferably higher than 1:10. In general, the main portion of the overall thickness of the gypsum plasterboard should be provided by the lower gypsum layer with the comparatively high density and/or hardness. In particular, it is sufficient for smoothly receiving the head of a fastening means (such as a screw or a nail) to provide a comparatively thin upper gypsum layer.

The first thickness is preferably higher than 0.5 mm, further preferably higher than 0.7 mm, even further preferably higher than 1.0 mm, even further preferably higher than 2.0 mm. Moreover, the first thickness may be lower than 10.0 mm, further preferably lower than 5.0 mm, even further preferably lower than 4.0 mm. Again, it is relevant that the first thickness is comparatively low (but sufficient to smoothly receive the head of a fastening means).

The first density is preferably below 880 kg/m$^3$, further preferably below 800 kg/m$^3$, even further preferably lower than 720 kg/m$^3$. Moreover, the second density may be higher than 850 kg/m$^3$, preferably higher than 880 kg/m$^3$, further preferably higher than 920 kg/m$^3$ and further preferably higher than 1000 kg/m$^3$. A ratio of the first density to the second density may be lower than 0.9, preferably lower than 0.75, even further preferably lower than 0.70.

The first hardness according to DIN EN 520:2009-12 is preferably >13 mm or ≥14 mm and/or not more than 15 mm. The second hardness is preferably ≤12 mm or ≤13 mm.

A ratio of the first hardness to the second hardness is preferably ≤1.3 or ≤1.4 and/or ≥1.1 or ≥1.2. The "hardness" is defined by the impact resistance (or surface hardness or German: Oberflächenhärte) according to 5.12 of DIN EN 520:2009-12 (Conditioning: 40° C.).

The upper and lower gypsum layers may be formed of the same material. The term "same material" in particular means that upper and lower gypsum layer contain the same compounds. Preferably, however, the term "same material" means that the same compounds with the same relative percentage are used.

Preferably, a pore volume of the first gypsum layer is different compared with, in particular higher than, a pore volume of the second gypsum layer. In such case, costs for manufacturing the gypsum plasterboard can be reduced (because similar or the same gypsum slurry can be used). On the other hand, by defining different pore volumes, in particular via different foaming agents or different amounts of the same foaming agent, an upper gypsum layer with a comparatively high pore volume can be provided so that a head of the fastening means can smoothly enter the upper gypsum layer.

For the first and second gypsum slurry the same components and/or additives may be used, preferably in similar amounts.

The different values of the hardness and/or density of the first and second gypsum layer may be achieved by different foaming agents and/or by different amounts of a (in particular the same) foaming agent and/or by different polymeric additives and/or by different amounts of a (in particular the same) polymeric additive and/or by different defoaming agents and/or by different amounts of a (in particular the same) defoaming agent and/or by different fibre additives and/or by different amounts of a (in particular the same) fibre additive and/or by different stiffening agents and/or by different amounts of a (in particular the same) stiffening agent and/or different crystallisation agents and/or by different amounts of a (in particular the same) crystallisation agent.

Preferably, the plasterboard is clad in a facer.

A first facer layer (e.g. paper layer) may be provided (directly) on the upper gypsum layer. Alternatively, or in addition, a second facer layer may be provided (directly) on the lower gypsum layer (or a third gypsum layer even lower than the lower gypsum layer). In particular, it is possible that a first facer layer is provided on the upper gypsum layer and no corresponding (second) facer layer is provided on the other side. Between first facer layer and upper gypsum layer and/or between second facer layer and/or lower gypsum layer, a bonding layer (such as an adhesive layer or skim coat) may be provided. It is also possible that the upper gypsum layer defines an outer surface of the overall gypsum plasterboard (in particular if no first facer layer is provided). If a first facer layer is provided, it is preferred that the upper gypsum layer is directly adjacent to such first facer layer (optionally only with a bonding layer in between).

Furthermore, it is preferred that the lower gypsum layer is directly adjacent (in contact) with the upper gypsum layer.

According to another aspect of the invention, a use of a gypsum plasterboard, in particular according to the predescribed kind, for a drywall construction is proposed, wherein the plasterboard comprises an upper gypsum layer having a first density, a first hardness, a first thickness and a lower gypsum layer having a second density, second hardness and a second thickness, wherein the first density is lower than the second density and/or wherein the first hardness is lower than the second hardness, wherein the first thickness is preferably lower than the second thickness, wherein the upper gypsum layer is arranged on a visible side of the plasterboard and/or wherein a head of the fastening means (such as a screw or a nail) is located on the upper gypsum layer.

According to another aspect of the invention a drywall construction (gypsum plasterboard system) is proposed, which comprises at least one gypsum plasterboard, in particular according to the predescribed kind, and at least one stud, wherein the at least one plasterboard is mounted or mountable to the at least one stud, the plasterboard comprising at least an upper gypsum layer having a first density, first hardness and first thickness and a lower gypsum layer having a second density, second hardness and a second thickness, wherein the first density is lower than the second density and/or the first hardness is lower than the second hardness, wherein the first thickness is preferably lower than the second thickness and wherein the upper gypsum layer is adjacent to a visible face or provides the visible face of the plasterboard when mounted to the stud. At least one fastening means with a head portion (such as a screw or a nail) may be provided, wherein the head portion may be located on the upper gypsum layer. The stud may be made of metal, in particular steel.

The drywall construction may further comprise a sheet element, such as a metal sheet element, in particular steel sheet element which may be arranged opposite to the head portion for receiving the opposite end portion of the fastening means (screw or nail). The metal sheet element may be a stud.

According to a further aspect of the invention, a method for fastening the gypsum plasterboard, in particular according to the predescribed kind, is proposed, wherein the plasterboard comprises at least an upper gypsum layer having a first density, first hardness and first thickness and a lower gypsum layer having a second density, second hardness and a second thickness, wherein the first density is lower than the second density and/or wherein the first hardness is lower than the second hardness, wherein the first thickness is preferably lower than the second thickness, wherein the plasterboard is fastened via at least one fastening means comprising a head portion such as a screw or a nail, wherein the fastening means is inserted into the gypsum plasterboard from a visible face being adjacent to the upper layer (an upper gypsum layer side).

Preferably, a percentage of a foaming agent in the first gypsum slurry for forming the first gypsum layer is higher than a percentage of the foaming agent in a second gypsum slurry for forming the second gypsum layer, wherein the gypsum slurries are preferably, except for the percentage of the foaming agent, at least substantially, identical. Alternatively, or in addition, a first foaming agent in a first gypsum slurry for forming the first gypsum layer may be different to a second foaming agent in a second gypsum slurry for forming the second gypsum slurry (in particular so that a pore volume of a gypsum layer manufactured by the first gypsum slurry is lower than a pore volume of a gypsum layer formed by the second gypsum slurry). The term "identical" gypsum slurry preferably means that the compounds of the gypsum slurry are identical. In particular, the term "identical gypsum slurry" means that also the percentage of the compounds (except for the foaming agent) are the same.

If there are more than two gypsum layers, it is preferred that density and/or hardness of the upper (upmost) gypsum layer is lower than a thickness and/or hardness of all other gypsum layers.

The first gypsum layer may be provided by a first gypsum board onto which a second gypsum board comprising the second gypsum layer is arranged (bonded) or onto which a slurry for preparing the second gypsum layer is applied. In general, the second gypsum layer may be provided by applying the second gypsum layer on an existing gypsum board providing the first gypsum layer. This process may be entirely separated from the production process or processes of the individual boards. It may even be performed by a different manufacturer.

BRIEF DESCRIPTION OF THE DRAWINGS

The enclosed figures illustrate the invention in more detail. The figures show.

DESCRIPTION OF THE INVENTION

Figure 1:
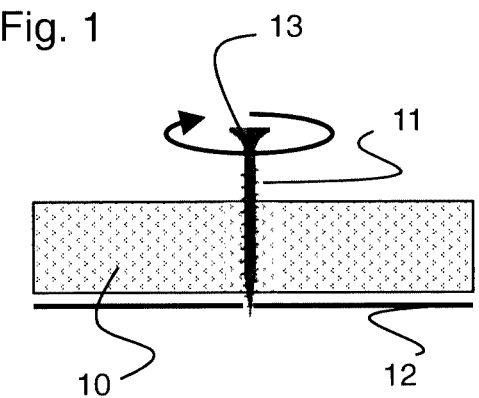
FIG. 1: A schematic cross-section of a gypsum plasterboard system according to the prior art.
Figure 2:
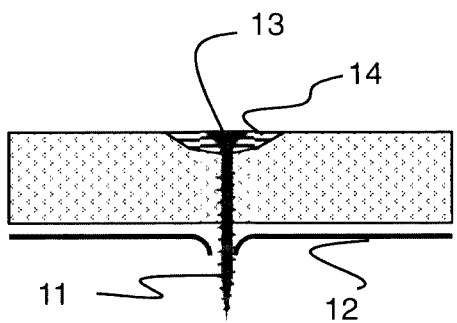
FIG. 2: a gypsum plasterboard system of FIG. 1 with inserted screw.
Figure 3:
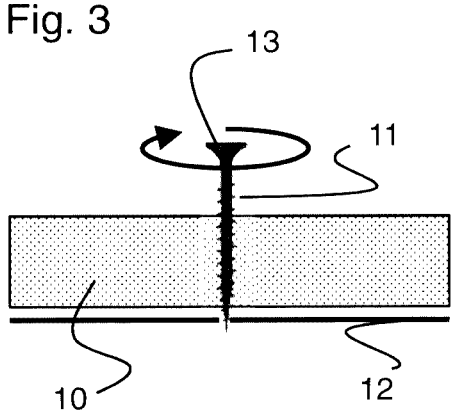
FIG. 3: a schematic cross-section of a further example of a gypsum plasterboard according to the prior art.
Figure 4:
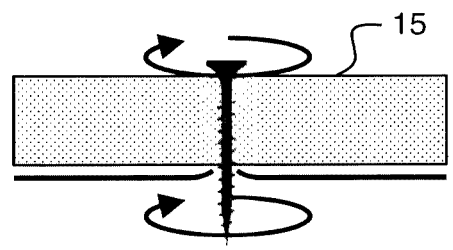
FIG. 4: a first structure obtained when inserting the screw in the plasterboard system of FIG. 3.

FIG. 1 shows a gypsum plasterboard system according to an example of the prior art. In this case, the gypsum plasterboard system comprises a gypsum plasterboard 10 having a raw density of e.g. less than 800 kg/m$^3$ (standard gypsum board), a screw 11 and a fastening profile element 12 (e.g. made of metal, in particular a steel stud). FIG. 2 shows the system of FIG. 1 with inserted screw 11. A portion around a head 13 of the screw 11 is compressed so that a compressed portion 14 is formed FIG. 3 shows another example of a gypsum plasterboard system according to the prior art. Contrary to FIGS. 1 and 2 (showing a standard, comparatively soft gypsum board), the gypsum plasterboard 11 of FIG. 3 is comparatively hard or of a high density (e.g. of more than 1000 kg/m$^3$). As can be seen in FIG. 4, when inserting the screw 11, there is a back buckling effect of the fastening profile element when the screw head and a board surface 15 of the gypsum plasterboard 10 contact each other.

Moreover, the screw head does not enter the gypsum plasterboard 10 so that the screw 11 rotates without grip.

Figure 5:
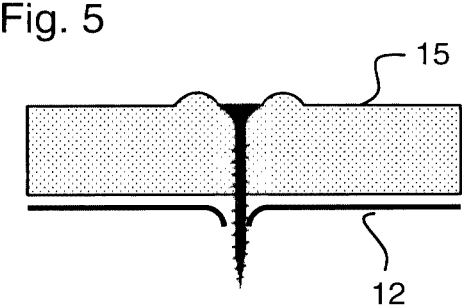
FIG. 5: a second potential result when inserting the screw of the plasterboard system of FIG. 3.

FIG. 5 shows a case where the screw head 13 of the screw 11 enters the gypsum plasterboard 10, when providing a gypsum plasterboard according to FIG. 3. In this case, the grip in the fastening profile element remains sufficient (because the screw head is allowed to enter the board's surface), but since the gypsum of the gypsum plasterboard is (more or less) incompressible because of its high density, the gypsum bulges around the head 13.

Figure 6:
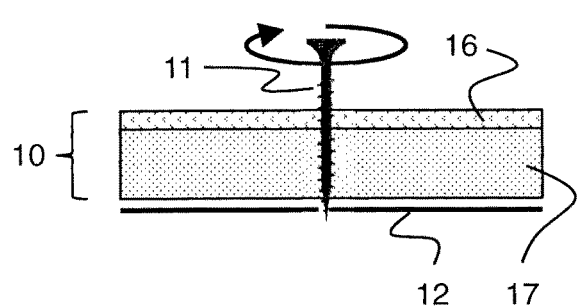
FIG. 6: a schematic cross-section of a gypsum plasterboard system according to the invention.

FIG. 6 shows a plasterboard system according to the invention. There, the gypsum plasterboard 10 comprises an upper gypsum layer 16 and a lower gypsum layer 17. Furthermore a screw 11 and a fastening profile element 12 are provided as shown in the prior art according to FIGS. 1 to 5. The upper gypsum layer 16 has a (raw) density of less than 800 kg/m$^3$. The lower gypsum layer 17 has a (raw) density of more than 1000 kg/m$^3$.

Figure 7:
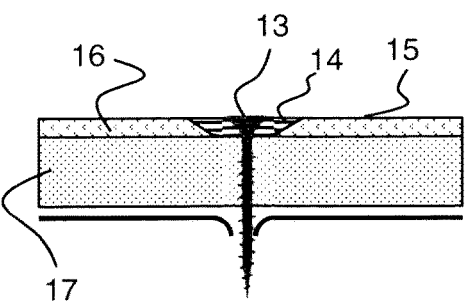
FIG. 7: the gypsum plasterboard system of FIG. 6 with inserted screw.

As can be seen in FIG. 7, the gypsum close to the board surface 15 is compressed in a compressed portion 14 and the screw head 13 enters the gypsum plasterboard 10. In particular, the screw head 13 is flush-fitting to the board surface. Moreover, there is a good grip in the fastening profile element due to the (hard) lower gypsum layer 17 (and also due to the compressed portion 14).

Figure 8:
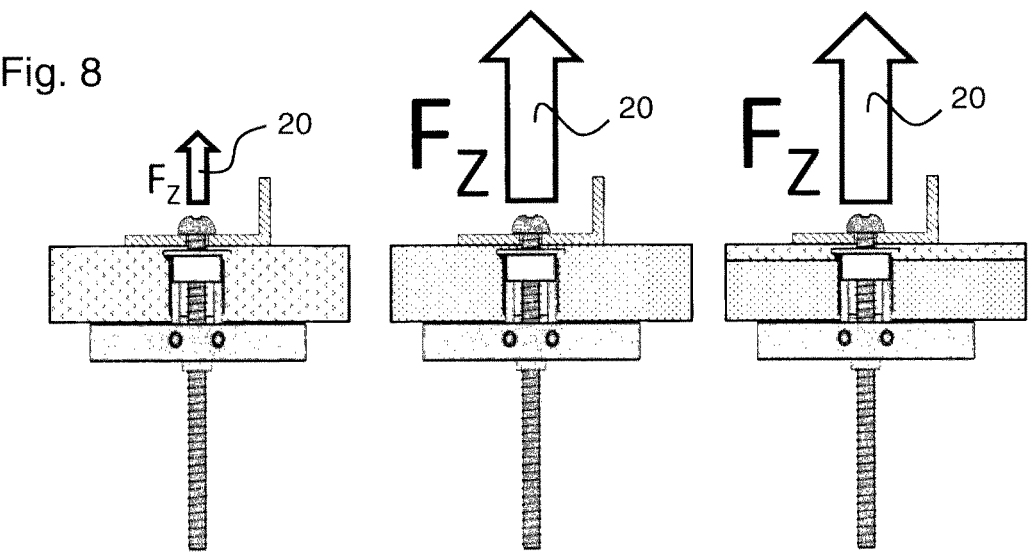
FIG. 8: schematic cross-sections of a gypsum plasterboard system according to the prior art in comparison with the present invention.

FIG. 8 shows a comparison between a plasterboard system with a comparatively soft gypsum plasterboard according to the prior art (left part of FIG. 8), a gypsum plasterboard system with a comparatively hard gypsum plasterboard according to the prior art (FIG. 8, middle portion) and a gypsum plasterboard system with a multilayer gypsum plasterboard according to the invention (FIG. 8, right part). In all gypsum plasterboard systems according to FIG. 8, a wall plug 19 holds a corresponding screw 11. As indicated by arrows 20, a load-bearing capacity (for pull-out) is for the gypsum plasterboard system in the left part of FIG. 8 substantially lower than for the middle and right part. In particular, since the grip of the wall plug is (also in the right part of FIG. 8, according to the invention) at least substantially located in the lower gypsum layer, there is no (substantial) difference between the example according to the middle part of FIG. 8 and the inventive embodiment according to the right part of FIG. 8.

Figure 9:
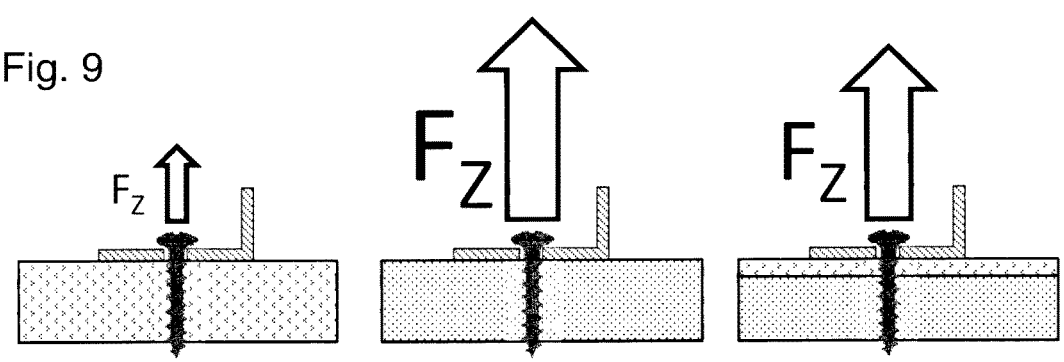
FIG. 9: a further comparison of the present invention with the prior art similar to FIG. 8.

FIG. 9 shows a plasterboard system according to a first example of the prior art (left part of FIG. 9), according to a second example of the prior art (FIG. 9, middle portion) and according to the invention (FIG. 9, right part). As can be seen, a load-bearing capacity for pull-out of the screw 11 is in FIG. 9, left part, substantially lower than in the middle part of FIG. 9 (prior art) and the right part of FIG. 9 (invention). Moreover, in the right part of FIG. 9 (invention)

the load-bearing capacity (for pull-out of the screw 11) is only minimally lower than in the prior art example according to the middle portion of FIG. 9. This results from the comparatively thin upper gypsum layer with respect to the comparatively thick lower gypsum layer. In a case where a thread portion of the screw 11 would be located only in the lower gypsum layer, there would be no (substantial) difference.

REFERENCE NUMERALS

10 Gypsum plasterboard
11 Screw
12 Fastening profile element
13 Screw Head
14 Compressed portion
15 Board surface
16 Upper gypsum layer
17 Lower gypsum layer
19 Wall plug
20 Arrow

The invention claimed is:

1. A gypsum plasterboard comprising at least an upper gypsum layer having a first hardness and a first thickness and a lower gypsum layer having a second hardness and a second thickness, wherein the first thickness is lower than the second thickness and wherein the first hardness is lower than the second hardness.

2. The gypsum plasterboard of claim 1, wherein a ratio of the first thickness to the second thickness is lower than 1:1.05.

3. The gypsum plasterboard of claim 1, wherein the first thickness is higher than 0.5 mm and lower than 5.0 mm.

4. The gypsum plasterboard of claim 1, wherein the first hardness is >13 mm.

5. The gypsum plasterboard of claim 1, wherein a ratio of the first hardness to the second hardness is ≤1.3.

6. The gypsum plasterboard of claim 1, wherein the upper and lower gypsum layers are distinguished by a pore volume, wherein a pore volume of the upper gypsum layer is higher than a pore volume of the second lower gypsum layer.

7. The gypsum plasterboard of claim 1, wherein the plasterboard is clad in a facer.

8. A drywall construction comprising a gypsum plasterboard according to claim 1, wherein the plasterboard comprises an upper gypsum layer having a first density, a first hardness and a first thickness and a lower gypsum layer having a second density, second hardness and a second thickness, wherein the first density is lower than the second density and wherein the first hardness is lower than the second hardness, wherein the first thickness is lower than the second thickness, wherein the upper gypsum layer is arranged on a visible side of the plasterboard and wherein a head of a fastening means comprising a screw or a nail is located on the upper gypsum layer.

9. A drywall construction comprising
at least one gypsum plasterboard according to claim 1 and
at least one stud, wherein the at least one plasterboard is mounted or mountable to the at least one stud, the plasterboard comprising at least an upper gypsum layer having a first density, a first hardness and a first thickness and a lower gypsum layer having a second density, a second hardness and a second thickness, wherein the first density is lower than the second density and wherein the first hardness is lower than the second hardness, wherein the first thickness is lower than the second thickness, and wherein the upper gypsum layer is adjacent to a visible face or provides the visible face of the plasterboard when mounted to the stud.

10. A method of fastening a gypsum plasterboard according to claim 1, wherein the plasterboard comprises at least an upper gypsum layer having a first density, a first hardness and a first thickness and a lower gypsum layer having a second density, a second hardness and a second thickness, wherein the first density is lower than the second density and wherein the first hardness is lower than the second hardness, wherein the first thickness is lower than the second thickness, wherein the method comprises fastening the plasterboard via at least one fastening means comprising a head portion, the fastening means comprising a screw or a nail, wherein the fastening means is inserted into the gypsum plasterboard from a visible face being adjacent to the upper gypsum layer.

11. The gypsum plasterboard of claim 1, wherein the upper gypsum layer has a first density and the lower gypsum layer has a second density, and
wherein the first density is lower than the second density.

12. The gypsum plasterboard of claim 11, wherein the first density is ≤880 kg/m$^3$.

13. The gypsum plasterboard of claim 11, wherein a ratio of the first density to the second density is ≤0.9.

14. The gypsum plasterboard of claim 1, wherein a ratio of the first thickness to the second thickness is lower than 1:2.

15. The gypsum plasterboard of claim 1, wherein a ratio of the first thickness to the second thickness is higher than 1:50.

16. The gypsum plasterboard of claim 1, wherein a ratio of the first thickness to the second thickness is higher than 1:20.

17. The gypsum plasterboard of claim 11, wherein the second density is ≥880 kg/m$^3$.

18. The gypsum plasterboard of claim 1, wherein the second hardness is ≤12 mm.

19. The gypsum plasterboard of claim 1, wherein a ratio of the first hardness to the second hardness is ≥1.1.

20. A gypsum plasterboard comprising at least an upper gypsum layer having a first density and a first thickness and a lower gypsum layer having a second density and a second thickness, wherein the first density is lower than the second density and wherein the first thickness is lower than the second thickness.

* * * * *